United States Patent
Bates et al.

(10) Patent No.: US 9,544,739 B2
(45) Date of Patent: Jan. 10, 2017

(54) ENHANCED 911 FOR FIXED WIRELESS

(71) Applicant: Cellco Partnership, Basking Ridge, NJ (US)

(72) Inventors: Peter C. Bates, Morristown, NJ (US);
Edward Gruskin, Verona, NJ (US);
Nishit Oza, North Andover, MA (US)

(73) Assignee: Cellco Partnership, Basking Ridge, NJ (US)

( * ) Notice: Subject to any disclaimer, the term of this patent is extended or adjusted under 35 U.S.C. 154(b) by 160 days.

(21) Appl. No.: 14/098,965

(22) Filed: Dec. 6, 2013

(65) Prior Publication Data
US 2015/0163642 A1  Jun. 11, 2015

(51) Int. Cl.
*H04W 4/04* (2009.01)
*H04W 4/02* (2009.01)
*H04W 4/22* (2009.01)
*H04W 76/00* (2009.01)

(52) U.S. Cl.
CPC ............... *H04W 4/043* (2013.01); *H04W 4/22* (2013.01); *H04M 2242/30* (2013.01); *H04W 4/02* (2013.01); *H04W 76/007* (2013.01)

(58) Field of Classification Search
None
See application file for complete search history.

(56) References Cited

U.S. PATENT DOCUMENTS

| | | | |
|---|---|---|---|
| 5,751,789 A | 5/1998 | Farris et al. | |
| 7,689,200 B1 * | 3/2010 | Zeller | H04W 4/22 455/404.1 |
| 2007/0060097 A1 * | 3/2007 | Edge | H04L 65/4007 455/404.1 |
| 2007/0115941 A1 * | 5/2007 | Patel et al. | 370/352 |
| 2007/0211692 A1 * | 9/2007 | Boroski et al. | 370/351 |
| 2007/0280213 A1 * | 12/2007 | Sindhwani et al. | 370/356 |
| 2008/0026728 A1 * | 1/2008 | Snapp | H04L 12/66 455/414.1 |
| 2008/0207220 A1 * | 8/2008 | Aaron | H04W 12/12 455/456.1 |
| 2009/0047924 A1 * | 2/2009 | Ray | H04M 3/5116 455/404.2 |
| 2011/0159845 A1 | 6/2011 | Sanjeev | |
| 2011/0201299 A1 | 8/2011 | Kamdar | |

OTHER PUBLICATIONS

U.S. Appl. No. 13/087,088, filed Apr. 14, 2011.

* cited by examiner

*Primary Examiner* — Charles Appiah
*Assistant Examiner* — Margaret G Mastrodonato

(57) ABSTRACT

A previously obtained location of a fixed wireless device is stored and available for processing of a call or the like from the device when a location determination may be desirable. In some circumstances, the previously obtained location of the fixed wireless device may be retrieved to provide information to a public-safety answering point (PSAP) during handling of an emergency call initiated by the fixed wireless device over a wireless network.

19 Claims, 6 Drawing Sheets

ENHANCED 911 FOR FIXED WIRELESS

BACKGROUND

Enhanced 911 (i.e., E911 or E-911) systems link emergency callers with appropriate public resources using an easy access code. The easy access code used throughout North America, for example, is 911. In most cases, a person in an emergency situation dials 911 to make a voice call to a public safety answering point (PSAP), although some PSAPs now support 911 text messaging as well. In order to provide emergency assistance to a caller, the E911 system attempts to associate a call with a location of the call. The location may be a physical address or other geographic reference information. The E911 system may use the caller's telephone number in various ways to identify a location that can be used to dispatch police, fire, emergency medical, and other response resources to the caller. Identifying the location of the emergency is especially helpful in situations when it may be difficult to communicate one's location, for example, during fires, break-ins, kidnappings, and other emergency events.

For a 911 call from a fixed landline, e.g. from a residence, the location determination usually entails a translation of telephone number data for the calling party's line into the calling location address (e.g. the address of the caller's residence). Effectively identifying the location of a mobile-originated call, however, presents difficulties not present in determination of location of a caller from a landline. When a mobile-originated call is made, for example, the E911 system may acquire the location of a cell tower to which the mobile device is connected. The location of the cell tower, however, may correspond to a radio coverage (cell) area of 10 to 100 square miles. Thus, precisely locating a caller within such a large area may prove difficult, or even impossible. To better assist locating mobile-originated callers, the E911 system may also attempt to obtain a more accurate position of the caller, for example, by using GPS and/or trilateration from some number of cell towers. Although this process may result in a more precise location of the caller, locating the caller using GPS and/or cell tower trilateration may take relatively long periods of time. For example, especially long periods of time may be required if the mobile terminal must initiate an initial position fix by syncing with GPS satellites, and/or the mobile device has to communicate with network-based systems that assist in position determination.

This disclosure focuses on E911 for fixed wireless devices. Fixed wireless devices are devices that communicate over a wireless network, similar to traditional mobile devices. Unlike traditional mobile devices, however, fixed wireless devices are immobile in nature. Fixed wireless devices, for example, may be situated in relatively fixed locations (e.g., such as installed at a home or office) during use for at least substantial periods. Despite being situated in relatively fixed locations, conventional fixed wireless devices operate with the same functionality and limitations associated with traditional mobile devices. For example, conventional fixed wireless devices suffer from limitations in effectively determining locations similar to those encountered in attempting to determine the location of mobile devices. Such limitations include the unreliable and/or inefficient identification of a location of a fixed wireless device that has made a 911 call.

BRIEF DESCRIPTION OF DRAWINGS

The drawing figures depict one or more implementations in accord with the present teachings, by way of example only, not by way of limitation. In the figures, like reference numerals refer to the same or similar elements.

DETAILED DESCRIPTION

Figure 1:
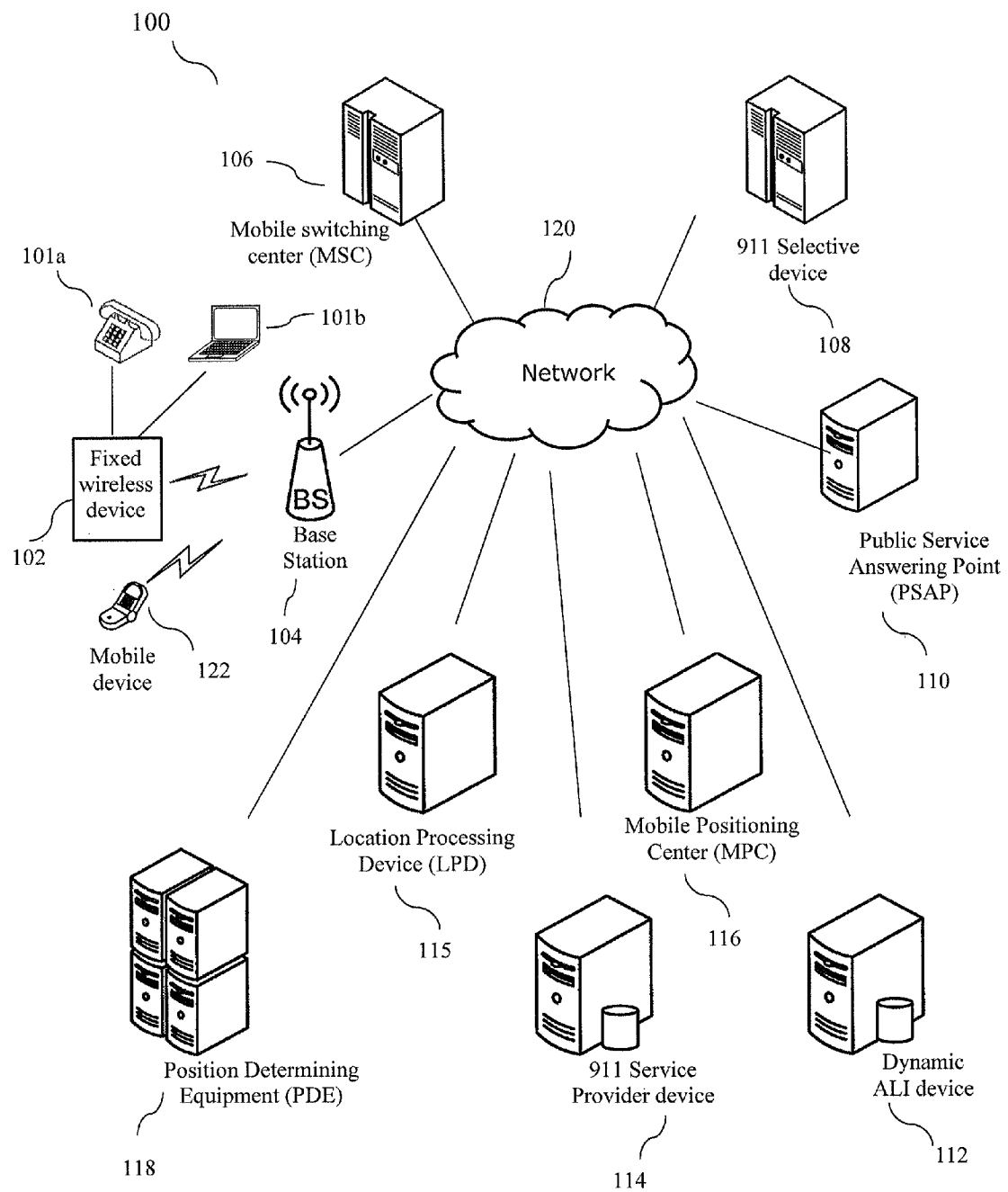
FIG. 1 is a simplified functional diagram that depicts various components of an exemplary mobile communications network, which offers a variety of services including E911 service for fixed and mobile wireless device users.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

To comply with 911 mandates, mobile service providers are expected to provide a mechanism for locating subscribers within their respective mobile network. A 911 mandate may require, for example, that the mobile service providers locate their respective subscribers within fifty (50) meters sixty-six percent (66%) of the time and locate their respective subscribers within one-hundred-fifty (150) meters ninety-five (95%) of the time. The mandates, however, are subject to change and may be amended to require a more accurate position determination.

The various examples disclosed herein relate to acquiring a location (e.g., a registered address) of a fixed wireless device during an enhanced 911 (E911) emergency call. Fixed wireless calling devices are wireless devices situated in fixed locations in a relatively permanent manner during use. Exemplary fixed wireless devices, for example, may be affixed to a structure such as a home or office and/or connected to on-premises wiring for power, audio or data communications, etc. Although the fixed wireless device may be affixed to a structure during use, in some examples, the fixed wireless device may include a handset (e.g., a cordless phone), and/or receiver, for making calls, or communicate at the premises with a portable data device (e.g. a dedicated E911 emergency device (such as a pendent), a Wi-Fi tablet). Further, the fixed wireless device may be moved by transferring the fixed wireless device from one location to another. It is expected that when a fixed wireless device moves from one location to another, that the fixed wireless device again be affixed to the other structure and/or wiring of the second location. In general, a fixed wireless device may be associated with a physical address (e.g., a house, an apartment, a business, a property, etc.) while affixed in some manner at a particular premises. The fixed wireless device itself can be moved throughout a region associated with the physical address. For example, a portable cordless phone associated with a physical address may be moved throughout a house, while communicating a base unit in or coupled to the fixed wireless device. The physical address associated with the fixed wireless device may be provided to the system 100 during registration for the E911 service. Even if the fixed wireless device is temporarily moved to a physical location outside of the region associated with the physical address (such as a grocery store), the registered address (not the current location) will still be stored by system 100. In some examples, the fixed wireless device may be moved to a new (different) physical address. For example, the user may move to a new apartment and set up the fixed wireless device in the new apartment. To associate the fixed wireless device with the new physical address, the user must register the new physical address with the system 100.

Conventionally, mobile-originated E911 calls (including calls made by conventional fixed wireless devices) may not always reliably provide a location of a calling party to an emergency call-taker. In a typical mobile-originated call, for example, location query mechanisms may attempt to determine the location of the mobile-originated caller by correlating the caller with the cell tower to which the mobile (i.e., wireless) device is connected. In some examples, the location of this cell tower may be the first location that a location query mechanism attempts to determine. The location of the cell tower is sometimes referred to as the coarse position of the wireless device, and typically represents a coarse position area of 10 to 100 square miles.

As can be easily realized, however, determining the actual location of a caller determined to be within a coarse position area (i.e., 10 to 100 square miles) may be difficult, or even impossible. Thus, locating a caller within such a large area, especially during an emergency, may be less than ideal. Thus, in examples, an alternative to locating a mobile-originated caller using coarse position may include a call-taker of an emergency call (e.g., E911 calls) inquiring, from the caller, the location of the caller. If the caller knows his/her address, and is able to correctly communicate this address to the call-taker, the caller may be able to provide to the call-taker an exact location (e.g., address) of the emergency. Unfortunately, this alternative may not always be available because a caller may not always be capable of accurately conveying his/her correct address to the call-taker, for numerous and varied reasons. Such reasons may include, but are not limited to, the caller not knowing the address (e.g., the caller being unfamiliar with the address because he/she is a stranger to the address, or is a child, etc.), the caller having been harmed, etc. Further, a caller may mistakenly provide incorrect information relating to the location of the call-taker. Such location determination issues may apply to mobile device locations, as well as to fixed wireless device locations.

Conventional methods and systems may also exist that obtain location information, sometimes known as fine position information, for mobile-originated calls. This fine position information may be more precise than coarse information. Fine position, for example, may provide location information that is accurate within tens of yards, rather than a location that is accurate within tens or hundreds of miles (as found in coarse position information). Fine position may be determined by using GPS and cell tower trilateration. Although fine position information is more precise than coarse information, however, the method of obtaining fine position information may suffer from a separate set of drawbacks. These drawbacks may include, for example, the amount of time required to obtain the fine position information. For example, it may take up to twenty minutes (or longer) to determine the fine position of a caller in some situations. Further, fine position may include inaccuracies, for a variety of reasons. Thus, an improved system and method are needed to automatically obtain the location (e.g., an address of the emergency) of a mobile-originated caller using a fixed wireless device during an emergency call.

Reference is now made in detail to the examples illustrated in the accompanying drawings and discussed below. FIG. 1 illustrates a mobile communication network 120 as may be operated by a carrier or service provider to provide a wide range of mobile communication services and ancillary services or features to its subscriber customers and associated fixed wireless users. The elements indicated by the network 120 generally are elements of the network and are operated by or on behalf of the carrier. The mobile communication network 120 may also provide communications between devices (e.g., mobile devices 122, fixed wireless devices 102, etc.) as well as communications for the devices (e.g., mobile devices 122, fixed wireless devices 102, etc.) with networks and stations outside the mobile communication network 120. Fixed wireless devices 102, as described above, may include devices that communicate via mobile communication network 120, but are affixed to a structure during use. As an example, devices, including telephones 101*a* and computing devices 101*b*, may be electronically connected to fixed wireless device 102 to communicate over mobile communication network 120, e.g. as an alternative to use of a PSTN landline and/or a wired or optical fiber broadband Internet access service. In addition, or alternatively, the fixed wireless device 102 itself may communicate over wireless communication network 120, e.g. if device 102 itself were to include a handset. The mobile communication network 120 provides wireless communication service for similar devices 102 at relatively fixed locations.

The address, such as the street address, of a fixed wireless device 102, may be provided to the system 100 in numerous and varied ways. In one example, a user of a fixed wireless device 102 may provide the address (e.g., the street address) of the fixed wireless device 102 when activating the fixed wireless device 102. This address may be stored in the location processing device (LPD) 115 of system 100. The user, for example, may provide the street address of the fixed wireless device 102 to the LPD 115 when the user subscribes to a service, e.g., when the user subscribes to the mobile communication service that the fixed wireless device 102 uses to communicate via the network 120. In alternatives, or, in combination, the user may provide the address to the LPD 115 after the user subscribes to the service. The user may provide the address of the fixed wireless device 102 during a registration process. Registration may be done on-line, via a call-in procedure from the device 102 or another telephone, at a store operated by the carrier, during an installation, etc. In these examples, the fixed wireless device 102, and a street address, may be associated with one another by associating the telephone number (i.e., MDN) of the fixed wireless device 102 with the address of the location where the fixed wireless device 102 is, or will be, set-up and operating. The address information may instead or additionally be associated with any other device identifier(s) for the fixed wireless device 102, including the mobile station identification (MSID), Mobile Identification Number (MIN), Mobile Equipment Identifier (MEID), International Mobile Subscriber Identity (IMSI) or the like that the mobile network 120 may have or associate with the fixed wireless device 102 for identification purposes.

Further, in some examples, the address of the fixed wireless device provided by the user may be validated for accuracy. In these examples, validation of the stored address may occur via a separate validation device (not shown). Validating the stored address may help to ensure that a user does not provide an incorrect address when activating the fixed wireless device 102, registering the device 102, etc. If a user provides an incorrect address, for example, the validating method may identify the incorrect address so that it can be corrected.

Users may provide incorrect addresses for various reasons, e.g., typographical errors, forgotten address, etc. To prevent, or lessen, the opportunity for users to provide incorrect addresses for the fixed wireless device 102, the validation device may validate the provided address of the fixed wireless device 102 against the actual location of the device 102. Validation, for example, may include determining the fine position of the fixed wireless device 102 after activation of the fixed wireless device 102. As indicated above, fine position information may be determined by using GPS and cell tower trilateration. Determining the fine position of the fixed wireless device 102 at activation allows the fine position of the fixed wireless device 102 to be computed prior to the user of the fixed wireless device 102 requiring emergency assistance. Because the fine position is computed prior to an emergency in this example, rather than during an emergency, the delay in determining the fine position of the fixed wireless device is not as detrimental as if the fine position needed to be determined during an emergency situation.

In an example in which the stored address is compared against a position (e.g., fine position), if the address of the stored address is determined to be within a certain, predefined, threshold of the fine position, the registered address of the fixed wireless device may be considered validated.

Alternatively, if the registered address is not within a predefined threshold of the fine position, a notification (e.g., an alarm, signal, a phone message, an email, a short message service (SMS) message, a multimedia message service (MMS) message, etc.) may be presented to the user of fixed wireless device 102, or the service provider, for further evaluation and possible corrective action. The notification may be presented to the user via fixed wireless device 102 or via any other device (such as a mobile phone, a computer, a telephone, etc.).

In one example, the fixed wireless device 102 includes a GPS device (such as GPS receiver 259 shown in FIG. 2) for providing GPS coordinates. During registration, the system 100 may request and receive GPS coordinates from the fixed wireless device 102. The validation device may compare the received GPS coordinates with information in a Geographic Information System (GIS) database to identify one or more possible addresses associated with the GPS coordinates. The validation device may then determine whether the registered address matches any of the identified address(es). Other examples for validating the address of the fixed wireless device may include identifying the location of the billing address of the user of the fixed wireless device 102. An example of an alternative form of validation might entail accessing a billing system or system of record associated with the service provider for the wireless service to the fixed wireless device. Yet another alternative example may involve identifying the location in which other services are provided to the user of the fixed wireless device 102, e.g., the address where the cable service, phone service, water service, etc., of the user is delivered, such as by accessing a billing system or the like associated with the other type of service), as well as other methods to determine, and validate, the location (e.g., address) of the fixed wireless device 102. In some examples, more than one system may be used to validate the registered address. If there is a discrepancy between the validation results, a notification may be sent to the user of the fixed wireless device 102 to confirm (or modify) the registered address.

The mobile communication network 120 is implemented by a number of interconnected networks. The overall network 120 may include a number of radio access networks (RANs), as well as regional ground networks interconnecting a number of RANs and a wide area network (WAN) interconnecting the regional ground networks to core network elements. A regional portion of the network 120, such as that serving one or more mobile devices 122 and one or more fixed wireless devices 102, will typically include one or more RANs and a regional circuit and/or packet switched network and associated signaling network facilities.

Physical elements of a RAN operated by one of the mobile service providers or carriers may include a number of base stations (BSs) 104. Although not separately shown, such a base station 104 typically comprises a base transceiver system (BTS) which communicates via an antennae system at the site of base station 104 and over the airlink with one or more of the mobile 122 and fixed wireless devices 102, when fixed wireless devices 102 are within range. Each base station 104 typically includes a BTS coupled to several antennae mounted on a radio tower within a coverage area often referred to as a "cell." The BTS is the part of the radio network that sends and receives radio frequency (RF) signals to/from the fixed wireless devices 102 that the base station 104 currently serves.

For convenience only, the drawings and description use terms like BS originally developed to describe elements of older mobile network technologies. The terms are used here, however, in a broader sense to also encompass equipment used for similar wireless link and routing/control purposes in more modern network technologies. In a 4G wireless network, for example, the wireless access node corresponding to the illustrated base station may take the form of a node referred to as an eNodeB, and the wireless devices are types of user equipment (UE) devices. Packet routing and control functions may be implemented in packet routers and/or associated server platforms in the RAN or in many cases in elements of an IP Multimedia Service (IMS) Core network coupled to some number of 4G RANs, although such routing and control element(s) are generically included in the broad class of devices that may be used to implement the functionality discussed here. In a similar fashion, later developed network implementations may use somewhat different elements in the location determination operations, including for fixed wireless devices.

The network 120 offers a variety of telecommunication services to users of mobile devices 122 as well as to users of fixed wireless devices 102. Examples include regular voice calls to other wireless devices on the network as well as to user telephone devices or other phone equipment on the public switched telephone network (not separately shown). The network 120 may also support a variety of messaging and/or data communication services. Of note for purposes of further discussion, however, the network 120 provides services enabling wireless device users to communicate in emergency situations, for example, to make 911 calls.

As shown in FIG. 1, various devices communicate via mobile communication network 120 to support E911 services. These devices may include mobile switching centers (MSCs) 106, 911 Selective device 108, public-safety answering point (PSAP) 110, mobile positioning center (MPC) 116, position determining entity (PDE) 118, 911 Service Provider device 114, automatic location identification (ALI) device 112, as well as other devices. In some examples, the ALI device 112 may be implemented as a dynamic ALI (DALI) database and/or system. For VOIP and fixed wireless call examples, the DALI may hold and deliver the street address. In addition, other devices not shown may support the E911 service, as well as other services described in this disclosure. The other individual elements (e.g., switches and/or routers) forming the network 120 may be omitted here for simplicity.

Figure 2:
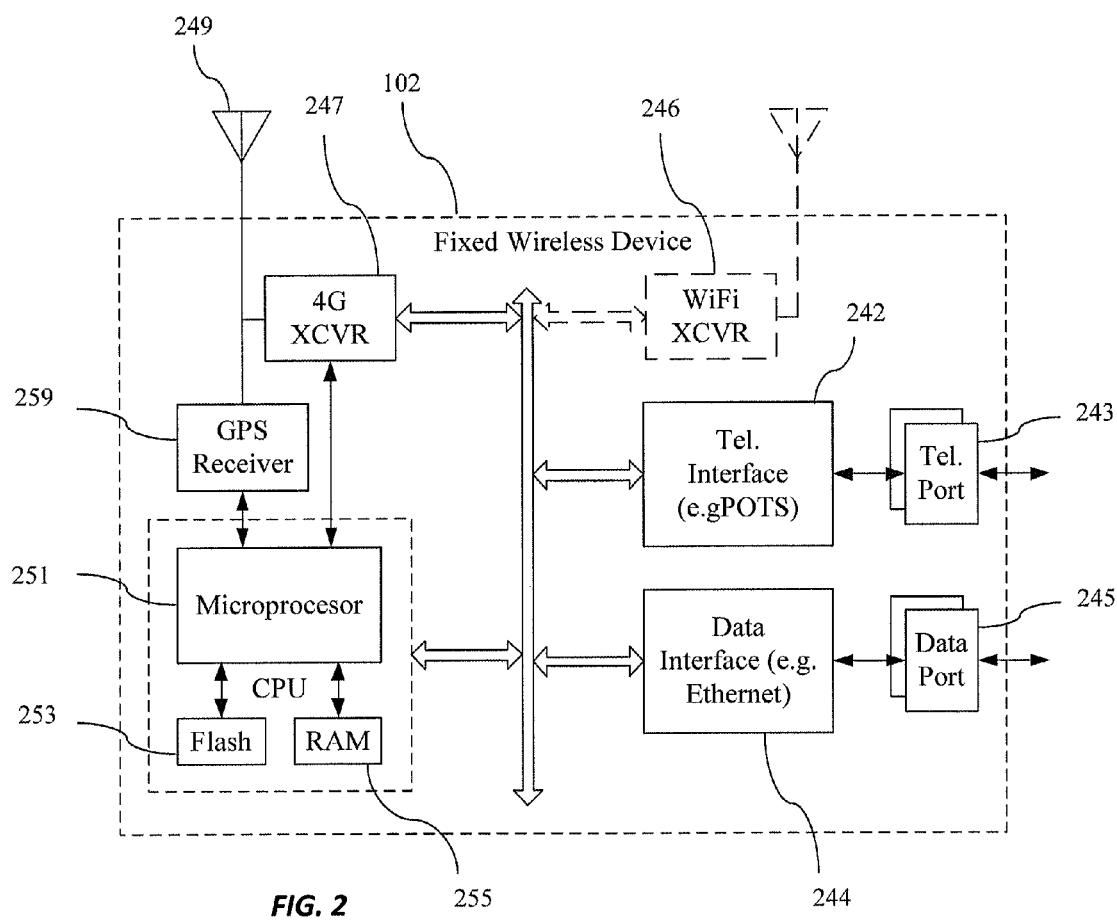
FIG. 2 is a simplified functional block diagram of a fixed wireless device.

FIG. 2 a functional block diagram of a 4G example of a fixed wireless device 102. The illustrated example represents a communications access device that provides communication services at a premises for telephone type services as well as for data services. Such a device may serve as a replacement for both landline telephone service and cable or fiber based broadband Internet access. Although fixed wireless devices may incorporate user interface elements, such as a handset, the example communicates with user devices at the premises via local media. The 4G access device is given here by way of an example, although the present discussion of E911 services may apply to other types of fixed wireless devices, e.g. to a fixed wireless device that provides only voice communication service, e.g. to an incorporated handset, via an associated cordless handset at the premises or via a dedicated emergency alert unit carried or worn by an occupant. A fixed wireless device 102, in the examples, may have characteristics of mobile phones, as well as non-mobile phones. A fixed wireless device 102, for example, is similar to a mobile phone because a fixed wireless device communicates over a mobile communication network 120. The fixed wireless device, however, is also similar to non-mobile phones, because, in examples, the fixed wireless device 102 may be affixed to a structure (e.g., home, office, etc.) found at a particular location (e.g., street address) during use of the fixed wireless device 102. As shown by earlier discussions above, a fixed wireless device 102 may raise issues impacting location determination in a manner similar to a mobile device 122. Because the location of device 102 is relatively fixed, however, it is possible to obtain and store location information for the device 102 in advance of a need for location determination, e.g. in advance of an actual E911 call or the like from the device 102.

The structure and operation of the fixed wireless device 102, as outlined below, are described by way of example only. The device may be similar to a mobile device, such as a smart-phone or tablet, or the device may be configured to provide voice and data services in association with satellite video services. For discussion purposes, the illustration shows an arrangement of the device 102 for providing voice telephone services and data services. Devices providing fixed wireless type services like those discussed relative to the example of FIG. 2 are available for residential services as a replacement for traditional landlines, as 4G home-connect products, e.g. from Verizon Wireless. Fixed wireless technologies for other wireless networks, e.g. utilizing 3G technologies, also are available. From the perspective of the wireless mobile communication network, in the 4G example of FIG. 2, the device 102 appears and functions essentially the same as any smart-phone or the line supporting voice and data services over 4G LTE.

For telephone service, in this example, the device 102 utilizes a packet based Voice over LTE (VoLTE) approach. Over the wireless link, voice to and from the device and signaling messages for call control purposes are communicated as digital data carried in IP packets similar to the IP packets that carry all other data services. For voice telephone communications within the premises, the fixed wireless devices includes a telephone interface 242 that connects to one or more standard telephone ports 243, such as RJ-11 ports.

The RJ-11 port in such an example provides a connection for standard customer premises wiring. To telephone equipment at the premises, the telephone interface 242 looks like a plain old telephone service (POTS) analog telephone line from a central office or the like. The interface for example, provides DC voltage/current, two-way analog audio, off-hook detection, ring tone, ringback, etc. as appropriate for normal analog telephone service at the customer premises. With two ports 243 and appropriate provisioning, the device 102 may be configured to support two telephone numbers and provide the appearance of two telephone lines at the premises, e.g. one for regular phone and another for a fax line.

The telephone interface 242 also provides two-way conversion between analog audio signals representing speech or other audio on the premises line(s) and digital samples at a compressed bit rate compatible with the digital protocol of the VoLTE wireless telephone service of the 4G mobile network communications or voice over packet (Internet Protocol—IP) communications. Of note, the voice call communications via the fixed wireless device 102 may also include E911 calls.

The fixed wireless device 102 also includes a data interface that provides protocol conversions between the internal data communication fabric of the device 102 (shown generally by way of example as a bus) and the data protocol used for home networking at the particular premises. In the example the data interface is an Ethernet interface 244 that provides wired Ethernet data communications via one or more data ports 245. The ports 245, for example, may be receptacles for plugs attached to CAT-5 cables or other structured cabling types. To Ethernet ready data devices at the premises, the Ethernet interface and associated packet switching/routing capability of the device 102 appear as an Ethernet based router with Internet access. Optionally, the device 102 may also provide wireless Ethernet data communication capabilities at the premises, e.g. through a wireless WiFi transceiver 246. If so, equipped, the router and WiFi transceiver appear to user equipment at the premises as a WiFi access point or hotspot.

For digital wireless communications, the fixed wireless device 102 also includes a 4G LTE type digital transceiver (XCVR) 247. The concepts discussed here, however, encompass examples of the fixed wireless device 102 that may utilize any digital transceiver that conforms to current or future developed digital wireless communication standards. For example, the transceiver 247 could be a Time Division Multiple Access (TDMA) or Global System for Mobile Communications (GSM) unit designed for cellular or Personal Communications Service (PCS) operation. In the present examples, the digital transceiver 247 may be a Code Division Multiple Access (CDMA) transceiver compatible with operation via an IS-95 network or a 1×RTT network, to provide both voice and packet data communications. Also, the fixed wireless device 102 may utilize either or both of 3GPP2 (1×RTT and EVDO) technologies and 3 GPP (LTE/GSM/UMTS) technologies. In other examples, multimode transceivers also may be used.

The transceiver 247 provides two-way wireless communication of information, such as vocoded speech samples and/or digital message information. The transceiver 247 also sends and receives a variety of signaling messages in support of the various services provided via the fixed wireless device 102 and the network 120, e.g. for set-up and tear-down of voice calls. In the 4G example, the transceiver 247 may transport such information for phone related communications and messaging services via wireless packet transmission and reception over the airlink. The 4G LTE transceiver 247 also provides two-way wireless communication of packet data for Internet access type services, e.g. web surfing, email, content streaming or download, etc., for data communications with user equipment at the premises via the Ethernet interface and/or the WiFi transceiver.

For purposes of the E911 discussion, it may be noted that the communications via the transceiver 247 and the antenna 249 may include various messages related acquisition assistance, position determination and related location based services. The transceiver 247 connects through RF send and receive amplifiers (not separately shown) to an antenna 249. In the example, the transceiver 247 is configured for RF communication in accord with a digital wireless protocol. The device 102 may include one or more additional transceivers, for example, for operation in an analog mode or in accord with an alternative digital standard.

A microprocessor 251 serves as the programmable controller in that it controls all operations of the fixed wireless station 102 in accord with programming that it executes. The device 102 also includes flash type program memory 253 and/or a non-volatile random access memory (RAM) 255, for storing various software routines and mobile configuration settings, such as mobile identification number (MIN), etc. In a present implementation, the flash type program memory 253 stores an operating system, device driver software, call processing software and vocoder control software; and the memory may store any of a wide variety of other applications or other software.

The memories 253, 255 also store various data, such as telephone numbers and server addresses and data input by the user. For example, the memory 253 and/or the memory 255 will at various times store coordinates obtained from GPS processing.

For position determination and associated location based services, the fixed wireless device 102 may also include a GPS receiver 259. Under control of the microprocessor 251, the GPS receiver 259 may receive and process signals from one or more satellites of the constellation of GPS satellites. From its processing, the GPS receiver 259 supplies GPS data to the microprocessor 251, such as pseudo-range measurements and associated PN codes for measured satellite signals. Associated computations may be performed in the microprocessor or by a processor or the like included in the GPS receiver.

If the GPS receiver 259 or the combination of the receiver 259 and the microprocessor 251 are configured to provide a fully functional GPS position determination device, the fixed wireless device 102 can process the pseudo-range measurements, absolute times of transmission of the GPS signals, and the satellite position data to compute the station's latitude and longitude. However, because of size/space/cost constraints on the design of the fixed wireless device 102, the GPS receiver 259 in the fixed wireless device 102 may have only reception capability, not the full GPS processing capability to resolve position from signals received from the satellites. In general, the GPS receiver 259 may provide location coordinates of the fixed wireless device 102. However, for the call-taker of the PSAP 110 (and ultimately for the emergency personnel), the physical address, not location coordinates is desired and would need to be identified. The identified location coordinates may also have some inaccuracy. Furthermore, if the caller is in a building having multiple residences, it may be difficult to determine to which residence to send the emergency personnel (such as in the case of a heart attack), based on the location coordinates.

Figure 3:
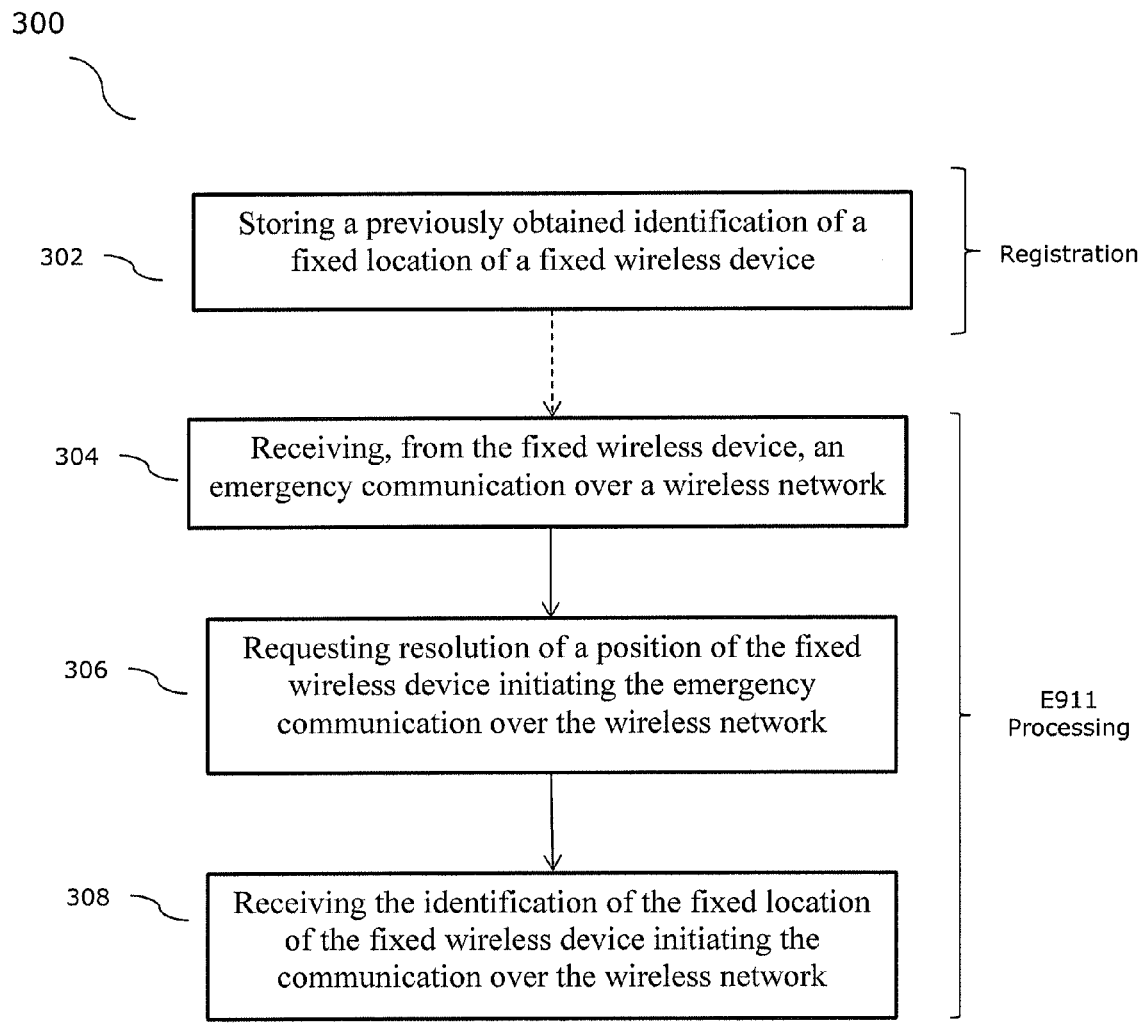
FIG. 3 is a flow diagram of an exemplary method for processing in relation to an E911 communication from a fixed wireless device.

FIG. 3 is a flow diagram showing steps of an exemplary method for determining an address of a fixed wireless device 102.

In at least some examples, the address determined will be a street address of a fixed wireless device. In other examples, the address of the fixed wireless device 102 may be any definitive location of the fixed wireless device 102. The address may be provided by the user of the fixed wireless device 102. The address may be provided, for example, during activation of the device 102, during registration of the device 102, or via other methods understood by those having skill in the art of fixed wireless devices 102.

Method 300 begins with step 302, in which an address of a fixed wireless device 102 is stored. Step 302 may be considered a registration step, because during this step the address of the fixed wireless device 102 may be stored during registration of the device 102. The position of the fixed wireless device 102 (e.g., street address, latitude/longitude position, etc.) may be stored in location processing device (LPD) 115, or in one or more of the devices illustrated in system 100. In this example, the device (e.g., the LPD 115) storing the address may receive the address of the fixed wireless device 102 during activation and/or registration of the fixed wireless device 102, as well as by other methods. Further, the stored address of the fixed wireless device 102 may be validated, to ensure that the device (e.g., LPD 115) is storing the correct location of the fixed wireless device 102. In one example, the stored address of the fixed wireless device 102 may be compared to fine position information, and/or coarse position information, of the fixed wireless device 102. In preferred examples, the comparison between the stored address of the fixed wireless device 102 and the fine position information may be compared during non-emergency times. For example, the stored address of the fixed wireless device 102 may be validated, immediately after activation of the fixed wireless device, at 3 a.m., etc. The address (e.g., street address) of the fixed wireless device 102 may be stored so that it is accessible by one or more of the devices found in system 100 during an emergency communication placed by the fixed wireless device 102 over the mobile communication network 120.

The remaining steps (i.e., steps 304-308) depicted on FIG. 3 may be considered steps used for obtaining a location of a fixed wireless device 102 during an emergency (e.g., E911 call). Method 300 continues with step 304, in which a device, such as a mobile switching center (MSC) 106 receives a communication from a fixed wireless device 102 over a mobile communication network 120. In preferred examples, the communication will be a voice message provided by a user of the fixed wireless device 102. Other examples, however, may include the communication being a short message service (SMS) message, multimedia message service (MMS) message, email, or any other form of communication that may be sent via the fixed wireless device 102. In preferred examples, the communication sent by the fixed wireless device 102 may be related to an emergency (e.g., call for assistance requiring medical, fire, police, etc., assistance). In this example, the communication may be sent to an entity, such as a call center (e.g., public service answering point (PSAP)), for providing assistance to the user of the fixed wireless device 102 for the respective emergency. If the fixed wireless device 102 is placing the call in North America, for example, the user of the fixed wireless device 102 may dial 911 to contact a 911 dispatcher.

Step 306 includes resolving the position of a fixed wireless device 102 during the fixed wireless device's 102 transmission of the communication over the wireless network 120. Resolution of the fixed wireless device's 102 position may include determining whether the position information of the fixed wireless device 102 should consist of coarse position information, fine position information, stored position (e.g., street address) information of the fixed wireless device 102, or a combination of the above. As described above, during a communication over a mobile network 120, varying levels of accuracy are available for the location of the fixed wireless device 102 communicating over the network 120.

Traditionally, the least accurate position information, coarse information, may include the location of a cell tower in which the mobile device 102 is communicating. Coarse position may provide an area of tens, or hundreds, of miles to determine the area of where the mobile device 102 may be located. A more accurate predictor of a mobile device's location is known as fine position, and may be computed using GPS and/or cell tower trilateration. Fine position is more accurate than coarse position, but the technique for obtaining fine position suffers from time delays, which may be problematic during emergency situations when the location of a caller using a mobile device 102 is needed. Accordingly, in some examples, the coarse position may be used (at least initially) in situations where the time delays for determining the fine position may be detrimental to providing suitable emergency services in a timely manner. According to aspects described in this disclosure, therefore, the third location, address position (e.g., street address information of the fixed wireless device 102), may be determined. The fixed position may include any location information indicating the location of the fixed wireless device 102, e.g., the street address of the fixed wireless device 102. Thus, the fixed position may be much more accurate than other described methods, e.g., coarse position, fine position, etc. Further, because the fixed position (e.g., street address) of the fixed wireless device 102 may be stored in a database and later retrieved when necessary, the time required to determine the fixed position of the fixed wireless device 102 may be minimal.

Thus, in these examples, system 100 may replace coarse position information and/or the fine position information with the stored address (e.g., street address) information of the fixed wireless device 102. In preferred examples, the 911 Service Provider device 114 retrieves the registered address from the LPD 115 for the fixed wireless device's MDN, and replaces the coarse position (and/or fine position) with the position information (e.g., street address) of the fixed wireless device 102. This replacement of the coarse position (and/or fine position information) with the address information of the fixed wireless device 102 may be known as resolving the position of the fixed wireless device 102.

In other examples, both the coarse location and the stored address can be used to immediately provide the call-talker with an initial location comparison. Both the coarse location and the stored address can be displayed to the call-talker of the PSAP 110. In addition, an on-screen notification may be presented to the call-taker. The notification may indicate a match (or a mismatch) between the coarse location and the stored address. In other examples, the notification can be relayed to the fixed wireless device 102. Presentation of the coarse location and the stored address (and/or the notification) may alert the call-taker to an incorrect location, so that emergency personnel are not unnecessarily dispatched to an incorrect location.

Method 300 concludes with step 308, which is the public service answering point (PSAP 110), or other device, receiving the identification of the fixed location (e.g., address) of the fixed wireless device communicating over the mobile wireless network 120. The PSAP 110, in one example, typically includes a call taker who is responsible for contacting emergency personnel and directing the emergency personnel to a user of fixed wireless device 102 who is in need of emergency assistance. Step 308, therefore, provides information (e.g., location information of the fixed wireless device 102) that is useful, and/or necessary, for the emergency personnel to reach those in need of emergency assistance. Because system 100 provides the location information (e.g., address information) of the fixed wireless device 102 to the PSAP 110, the PSAP 110 may therefore provide the fixed position information to the personnel providing the emergency assistance.

As described above, the fixed position that is provided to the emergency personnel is more accurate than conventional location information (e.g., coarse position, fine position) relating to fixed wireless devices 102. Because the emergency personnel receive more accurate location information, according to aspects described in this disclosure, the emergency personnel are able to provide more timely assistance to users of fixed wireless devices 102 requiring such assistance.

Figure 4:
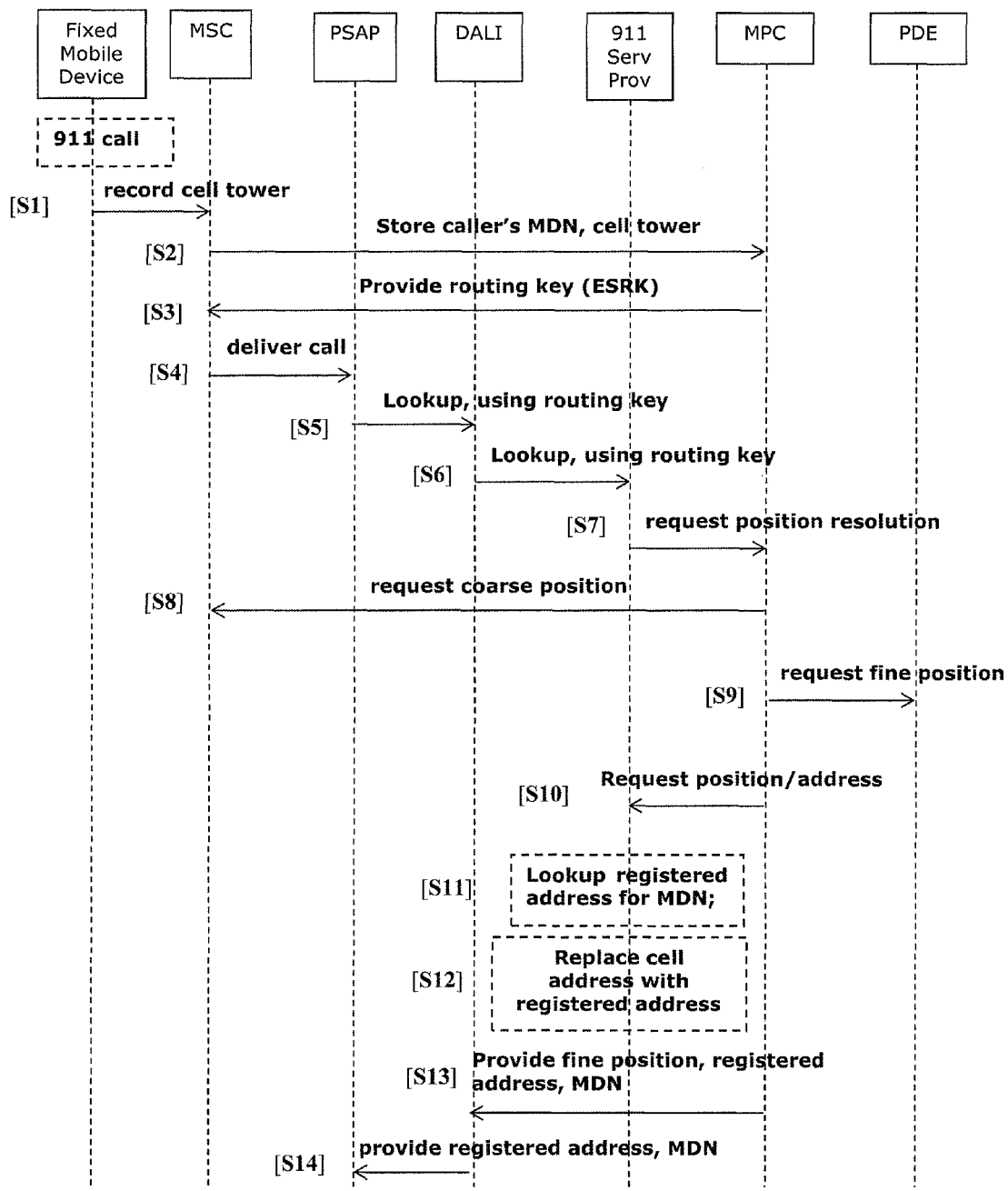
FIG. 4 is a simplified example of a sequence of communications depicted in the exemplary method of FIG. 3 for processing an E911 communication.

FIG. 4 illustrates a specific example of the process shown in FIGS. 1 and 3. In FIG. 3, a caller using a fixed wireless device 102 calls an easy access number (e.g., 911) during an emergency (S1). In this example, the emergency call is routed to mobile switching center (MSC) 106, by the network 120. The MSC 106 is responsible for managing communications between the fixed wireless device 102 (or mobile device 122) and the other elements of the network 120. In addition, the MSC 106 is responsible for handling voice calls, messaging service communications, as well as other services (such as conference calls, faxes, and data). The MSC 106 sets up and releases the end-to-end connection, handles mobility and hand-over requirements during the call. The MSC 106 may manage the cell sites, the voice trunks, voicemail, and SS7 links.

After receiving the emergency call, the MSC 106 records an identification of the cell tower from which wireless communication has originated (S2). This identification is used to obtain coarse position (e.g., cell tower position) that is used to determine the fixed wireless caller's location. The MSC 106 may determine that the call is an emergency call, and may store the caller's directory number (MDN). In this example, MSC 106 may send a request (including the MDN and identification of the serving cell tower) to mobile positioning center (MPC) 116 (S3). MPC 116 uses this information to determine a routing key (e.g., an emergency services routing key, or ESRK), and MPC 116 returns ESRK to MSC 106. In some examples, the ESRK is a key that is used to identify a 911 call through the system. In these examples, the ESRK allows the various devices within system 100 to correlate the information from a caller, to the location information that is developed as the call is completed. The MSC 106 relays the call to a 911 Selective device 108 to select an appropriate public service answering point (PSAP) 110. The PSAP 110 may include a server, typically implemented in a call center, responsible for handling emergency calls such as calls for police, ambulance, and firefighter services.

The emergency call is next delivered to the selected PSAP 110 and assigned to a call-taker (S4). The call-taker communicates with the caller to determine information relevant to the emergency, e.g., the cause of the emergency, the severity of the emergency, the location of the emergency, etc. In some examples, the PSAP 110 may know that the caller is using a wireless device (e.g., fixed wireless device 102). In one example, the PSAP 110 receives the call as a voice telephone call. In other examples, however, PSAP 110 may receive the emergency call as a short message service (SMS) message, multimedia message service (MMS) message, or the like.

In examples relevant to the present fixed wireless discussion, the caller will be communicating to the PSAP via a fixed wireless device 102 configured to communicate through the network 120. The PSAP 110, in some examples, may attempt to determine the location of the fixed wireless device 102 caller. One such example of determining the location of a fixed wireless device includes retrieving a stored address of the fixed wireless device from which the caller is communicating with the PSAP 110. The stored address of the fixed wireless device 102 may be an address (e.g., street address) at which the fixed wireless device 102 is located. In this example, as described above, the address may have been provided by a user during an earlier registration process. The address of the fixed wireless device 102, however, may be stored using many and various processes.

During the 911 call handling process, the PSAP 110 may request the stored address of the fixed wireless device 102 via a lookup, e.g., may request the address of the fixed wireless device from 911 Service Provider device 114 or from automatic location identification (ALI) device 112 or DALI device (S5). In some examples, the ESRK will be used as the routing key when performing the automatic location identification lookup.

In one example, the ALI device 112 (or DALI device) recognizes the routing key (e.g., ESRK). The ALI device 112 forwards the location request to the 911 Service Provider device 114 associated with the routing key (S6). The 911 service provider device 114 may be implemented as a computer, database, or the like. 911 Service Provider device 114 may process the stored address of the fixed wireless device 102. In some examples, the 911 Service Provider device 114 may relay a request, for position and location resolution, to MPC 116 (S7). The 911 Service Provider device 114 may also request the caller's MDN from the MPC 116. In this example, the 911 Service Provider device 114 uses the directory number of the caller to identify the service address (e.g., street address, latitude/longitude, etc.) with which the fixed wireless device 102 is associated.

MPC 116 uses the routing key (e.g., ESRK) to identify the switch that originated the 911 call. Thereafter, MPC 116 may request coarse position information from the MSC 106 (S8). The MSC 106 uses the routing key (e.g., ESRK) that it associated with the caller of the fixed wireless device 102 to access and return identifying information (e.g., MDN) of the caller, as well as coarse information (e.g., cell tower information) to the MPC 116. The MPC 116 may look up the address of the originating cell tower, and, at the same time, request a fine position determination from the position determining entity (PDE 118) (S9). Network 120 may include PDE 118 to determine fine position information. In assisted GPS (global positioning system) type deployments, for example, PDE 118 provides data to fixed wireless device 102 to expedite satellite acquisition. The exemplary network 120 utilizes an assisted GPS approach to determine the location of the fixed wireless device 102. The fixed wireless device 102 may take measurements of signals from a number of GPS satellites and interact with the PDE 118 to process those measurements so as to determine the latitude and longitude (and possibly altitude) of the current location of the fixed wireless device 102.

The MPC 116 returns the identification information (e.g. MDN), coarse location (e.g., cell tower location), and location description (cell tower address) to the 911 Service Provider device 114. As indicated above, 911 Service Provider device 114 may already have stored the address of the fixed wireless device 102.

The 911 Service Provider device 114 uses the MDN to probe a database for the stored (e.g., stored during registration) address of the caller using the fixed wireless device 102 (S10). In some examples, 911 Service Provider device 114 may probe a database, or other device, of an ALI device 112 to obtain the address of the fixed wireless device 102 (S11). In other examples, the 911 Service Provider device 114 may itself store the address of the fixed wireless device 102. In the example having the ALI device 112 return the address of the fixed wireless device 102, the position of the cell tower will no longer be associated as the primary position of the fixed wireless caller. Rather, in this example, the registered address of the fixed wireless device 102 replaces the coarse position as the primary location of the fixed wireless device 102 (S12). In examples, the coarse location, and the fine position, may also be associated with the fixed wireless device 102, as secondary locations to the registered address. The registered address of the device 102 may be a street address of the fixed wireless device 102, the longitude/latitude position of the fixed wireless device 102, or any other position information that provides a precise location of the fixed wireless device 102.

The ALI device (e.g., dynamic ALI device) 112 returns the location information of the caller of the fixed wireless device 102 using the location (e.g., address) of the fixed wireless device 102 (S13). In some examples, the location information will be transmitted to the PSAP 110 (S14). As indicated above, the position information may include registered address location, coarse position information, and fine position information. The PSAP 110 sends the position information, including the registered address information of the device 102, to the relevant emergency personnel so that the caller may receive the desired emergency assistance.

Figure 5:
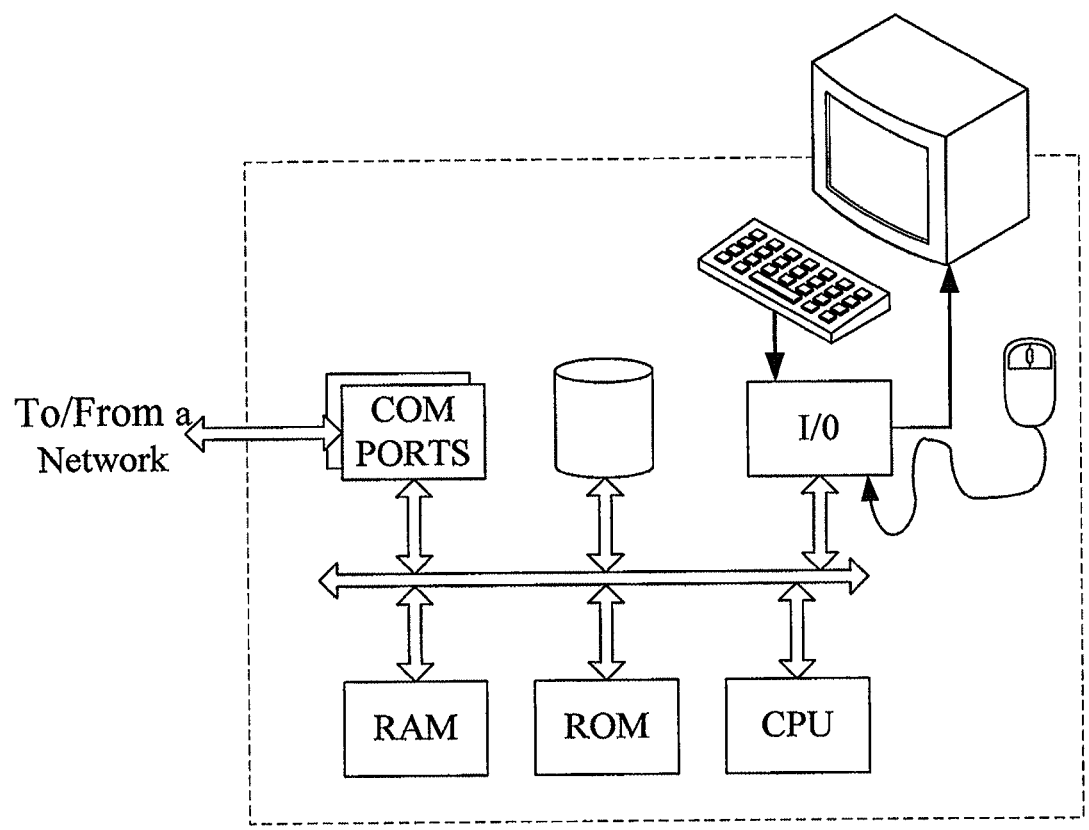
FIG. 5 is a simplified functional block diagram of a computer that may be configured as a host or server, for example, to function as a server for the components depicted in FIG. 1.
Figure 6:
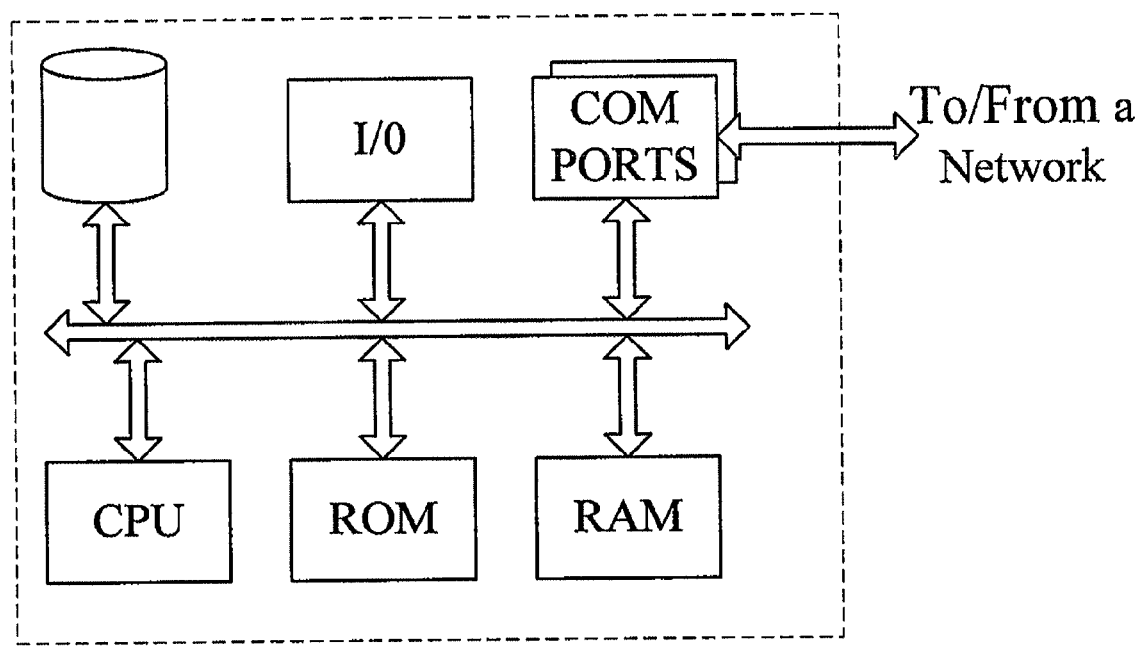
FIG. 6 is a simplified functional diagram of a personal computer or other work station or mobile device.

FIGS. 5 and 6 provide functional block diagram illustrations of general purpose computer hardware platforms. FIG. 5 illustrates a network or host computer platform, as may be used to implement a server, such as for the Mobile Positioning Center (MPC), the 911 Service Provider device 114, the DALI 112, etc. FIG. 6 depicts a computer with user interface elements, as may be used to implement a personal computer or other type of work station or terminal device, although the computer of FIG. 6 may also act as a server if appropriately programmed. The general aspects of the structure, programming and general operation of such computer equipment and as a result the drawings should be well known and self-explanatory from the illustrations in these drawings.

A computer for a server function, for example, includes a data communication interface for packet data communication. The server computer also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar computer platforms, to distribute the processing load.

Also, aspects of the systems and methods outlined above may be embodied in programming. Program aspects of the technology may be thought of as "products" or "articles of manufacture" typically in the form of executable code and/or associated data about various stations involved in the proximate device locator service that is carried on or embodied in a type of machine readable medium. "Storage" type media include any or all of the memory of the computers, processors or the like, or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the software programming from a computer or processor into the server computer, for example, into any of the 911 Service Provider device 114, the DALI 112, etc. from another computer of the mobile network operator or of a location service provider. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible or non-transitory "storage" media, terms such as computer or machine "readable medium" refer to any medium that participates in providing instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed:

1. A system, comprising:
    a 911 Service Provider device having a processor and configured to store an address of a fixed wireless device;
    a location validation device configured to:
        obtain fine position information determined by using Global Positioning System information and cell tower trilateration information for the fixed wireless device after an initial activation of the fixed wireless device and prior to receiving any emergency communications from the fixed wireless device; and
        validate the address of the fixed wireless device stored in the 911 Service provider device based on the obtained fine position information after the initial activation of the fixed wireless device and prior to receiving any emergency communications from the fixed wireless device;
    a mobile switching center (MSC) configured to receive, from the fixed wireless device, an emergency communication over a wireless network;
    a mobile positioning center (MPC) device configured to provide an emergency services routing key (ESRK) for the emergency communication to the MSC; and
    a dynamic automatic location identification (DALI) device configured to request resolution of a position of the fixed wireless device in connection with the emergency communication;
    wherein the MSC is further configured to deliver the emergency communication to a public safety answering point (PSAP) using the ESRK; and wherein the DALI device is further configured to:
receive, from the PSAP, a request for the address of the fixed wireless device, wherein the request for the address includes the ESRK;
obtain the address of the fixed wireless device stored in the 911 Service Provider device; and
transmit the obtained address of the fixed wireless device to the PSAP.

2. The system of claim 1, wherein the address comprises a street address of the fixed wireless device.

3. The system of claim 1, further comprising a location processing device configured to:
obtain the address of the fixed wireless device during the initial activation of the fixed wireless device; and
transmit, to the 911 Service Provider device, the obtained address of the fixed wireless device.

4. The system of claim 3, wherein the location processing device is further configured to:
associate the address with the fixed wireless device using a mobile telephone number of the fixed wireless device; and
transmit, to the DALI device, (1) the address of the fixed wireless device, (2) the mobile telephone number of the fixed wireless device, and (3) an association of the address of the fixed wireless device with the mobile telephone number.

5. The system of claim 1, wherein the MPC device is configured to provide identification information to the 911 Service Provider device, wherein the identification information includes:
coarse location information for the emergency communication based on a most currently available cell tower information associated with the fixed wireless device;
fine location information for the emergency communication based on a most currently available Global Positioning System (GPS) information associated with the fixed wireless device; and
a Mobile Directory Number (MDN) associated with the fixed wireless device.

6. The system of claim 1, wherein, when validating the address of the fixed wireless device, the location validation device is further configured to:
validate the address by comparing the Global Positioning System information with information stored in a Geographic Information System database to identify one or more addresses associated with the Global Positioning System information.

7. The system of claim 5, wherein the MPC device is configured to obtain the coarse location information from the MSC.

8. The system of claim 5, wherein the MPC device is configured to obtain the fine location information from a Positioning Determining Equipment (PDE) device, wherein the PDE device is configured to assist the fixed wireless device in performing GPS calculations.

9. A method, comprising:
storing, by a 911 Service Provider device having a processor, an address of a fixed wireless device;
obtaining, by a location validation device, fine position information determined by using Global Positioning System information and cell tower trilateration information for the fixed wireless device after an initial activation of the fixed wireless device and prior to receiving any emergency communications from the fixed wireless device;
validating, by the location validation device, the address of the fixed wireless device stored in the 911 Service Provider device based on the obtained fine position information after the initial activation of the fixed wireless device and prior to receiving any emergency communications from the fixed wireless device;
receiving, by a mobile switching center (MSC) from the fixed wireless device, an emergency communication over a wireless network;
providing, by a mobile positioning center (MPC) device, an emergency services routing key (ESRK) for the emergency communication to the MSC;
delivering, by the MSC, the emergency communication to a public safety answering point (PSAP) using the ESRK;
receiving, by a dynamic automatic location identification (DALI) device and from the PSAP, a request for the address of the fixed wireless device, wherein the request for the address includes the ESRK;
obtaining, by the DALI device, the address of the fixed wireless device stored in the 911 Service Provider device; and
transmitting, by the DALI device, the obtained address of the fixed wireless device to the PSAP.

10. The method of claim 9, wherein the address comprises a street address of the fixed wireless device.

11. The method of claim 9, further comprising:
obtaining, by a location processing device, the address of the fixed wireless device during the initial activation of the fixed wireless device; and
transmitting, from the location processing device to the 911 Service Provider device, the obtained address of the fixed wireless device.

12. The method of claim 11, further comprising:
associating the address with the fixed wireless device using a mobile telephone number of the fixed wireless device; and
transmitting, to the DALI device, (1) the address of the fixed wireless device, (2) the mobile telephone number of the fixed wireless device, and (3) an association of the address of the fixed wireless device with the mobile telephone number.

13. The method of claim 9, further comprising:
providing, by the MPC device, identification information to the 911 Service Provider device, wherein the identification information includes:
coarse location information for the emergency communication based on cell tower information associated with the fixed wireless device;
fine location information for the emergency communication based on Global Positioning System (GPS) information associated with the fixed wireless device; and
a Mobile Directory Number (MDN) associated with the fixed wireless device.

14. The method of claim 9, wherein validating the address of the fixed wireless device includes:
validating the address by comparing the Global Positioning System information with information stored in a Geographic Information System database to identify one or more addresses associated with the Global Positioning System information.

15. One or more non-transitory computer-readable memory devices storing instructions executable by one or more processors, the one or more non-transitory computer-readable memory devices comprising:
one or more instructions to store, by a 911 Service Provider device, an address of a fixed wireless device;
one or more instructions to obtain, by a location validation device, fine position information determined by using Global Positioning System information and cell tower trilateration information for the fixed wireless device after an initial activation of the fixed wireless device and prior to receiving any emergency communications from the fixed wireless device;

one or more instructions to validate, by the location validation device, the address of the fixed wireless device stored in the 911 Service provider device based on the obtained fine position information after the initial activation of the fixed wireless device and prior to receiving any emergency communications from the fixed wireless device;

one or more instructions to receive, by a mobile switching center (MSC) from the fixed wireless device, an emergency communication over a wireless network;

one or more instructions to provide, by a mobile positioning center (MPC) device, an emergency services routing key (ESRK) for the emergency communication to the MSC;

one or more instructions to deliver, by the MSC, the emergency communication to a public safety answering point (PSAP) using the ESRK;

one or more instructions to receive, by a dynamic automatic location identification (DALI) device and from the PSAP, a request for the address of the fixed wireless device, wherein the request for the address includes the ESRK;

one or more instructions to obtain, by the DALI device, the address of the fixed wireless device stored in the 911 Service Provider device; and one or more instructions to transmit, by the DALI device, the obtained address of the fixed wireless device to the PSAP.

16. The one or more non-transitory computer-readable memory devices of claim 15, wherein the address comprises a street address of the fixed wireless device.

17. The one or more non-transitory computer-readable memory devices of claim 15, further comprising:

one or more instructions to obtain, by a location processing device, the address of the fixed wireless device during the initial activation of the fixed wireless device; and one or more instructions to transmit, from the location processing device to the 911 Service Provider device, the obtained address of the fixed wireless device.

18. The one or more non-transitory computer-readable memory devices of claim 17, further comprising:

one or more instructions to associate the address with the fixed wireless device using a mobile telephone number of the fixed wireless device; and one or more instructions to transmit, to the DALI device, (1) the address of the fixed wireless device, (2) the mobile telephone number of the fixed wireless device, and (3) an association of the address of the fixed wireless device with the mobile telephone number.

19. The one or more non-transitory computer-readable memory devices of claim 15, wherein the one or more instructions to validate the address of the fixed wireless device include:

one or more instructions to validate the address by comparing the Global Positioning System information with information stored in a Geographic Information System database to identify one or more addresses associated with the Global Positioning System information.

\* \* \* \* \*